United States Patent
Hirai et al.

(10) Patent No.: US 8,917,058 B2
(45) Date of Patent: Dec. 23, 2014

(54) BATTERY CHARGING CONTROL SYSTEM

(75) Inventors: Takuya Hirai, Susono (JP); Yuichi Shimasaki, Mishima (JP); Yoshinori Futonagane, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 359 days.

(21) Appl. No.: 13/519,709

(22) PCT Filed: Jan. 22, 2010

(86) PCT No.: PCT/JP2010/050788
§ 371 (c)(1),
(2), (4) Date: Jun. 28, 2012

(87) PCT Pub. No.: WO2011/089708
PCT Pub. Date: Jul. 28, 2011

(65) Prior Publication Data
US 2012/0293124 A1    Nov. 22, 2012

(51) Int. Cl.
*H02J 1/00*    (2006.01)
*H02J 7/00*    (2006.01)
*H02J 3/00*    (2006.01)
*H02J 9/00*    (2006.01)
*H02J 7/14*    (2006.01)

(52) U.S. Cl.
CPC ............ *H02J 7/1423* (2013.01); *Y02T 10/7011* (2013.01); *Y02T 10/7016* (2013.01)
USPC ........... 320/112; 320/104; 320/123; 320/125; 307/80; 307/84; 307/87; 307/150

(58) Field of Classification Search
CPC ................ H02J 1/00; H02J 7/00; H02J 7/14; H02J 3/00; H02J 9/00
USPC ........ 320/112, 104, 123, 125; 307/80, 84, 87, 307/150, 153
See application file for complete search history.

(56) References Cited

U.S. PATENT DOCUMENTS 4,188,527 A * 2/1980 Follmer ..................... 219/202
5,057,763 A * 10/1991 Torii et al. ..................... 322/8
(Continued)

FOREIGN PATENT DOCUMENTS

JP    A-01-126136    5/1989
JP    A-2000-184613    6/2000
(Continued)

OTHER PUBLICATIONS

Mar. 30, 2010 International Search Report issued in International Patent Application No. PCT/JP2010/050788.

*Primary Examiner* — Phallaka Kik
(74) *Attorney, Agent, or Firm* — Oliff PLC (57) ABSTRACT

An object of the invention is to make the charging power as high as possible in a battery charging control system for selectively charging a plurality of batteries having different voltages with energy generated by an alternator. To achieve the object, the battery charging control system according to the invention includes an alternator having a variable generation voltage and a plurality of batteries having different charging voltages, wherein maximum generation power defined as the highest power that the alternator can generate and maximum charging power defined as the highest power that each battery can accept are obtained, and a battery for which the charging power is highest is selected to be charged based on a comparison of the maximum generation power and the maximum charging power.

16 Claims, 7 Drawing Sheets

(56) References Cited

U.S. PATENT DOCUMENTS

| | | | |
|---|---|---|---|
| 5,483,146 A * | 1/1996 | Schultz et al. | 322/7 |
| 7,176,659 B2 * | 2/2007 | Asao et al. | 322/28 |
| 2002/0027425 A1 * | 3/2002 | Asao et al. | 322/28 |
| 2004/0130292 A1 * | 7/2004 | Buchanan et al. | 320/116 |
| 2008/0197796 A1 * | 8/2008 | Bae et al. | 318/432 |
| 2008/0215266 A1 * | 9/2008 | Mizuno et al. | 702/63 |
| 2009/0001926 A1 * | 1/2009 | Sato | 320/102 |
| 2009/0174369 A1 * | 7/2009 | Kawahara et al. | 320/150 |
| 2011/0227525 A1 * | 9/2011 | Blackall et al. | 320/107 |

FOREIGN PATENT DOCUMENTS

| | | |
|---|---|---|
| JP | A-2000-350379 | 12/2000 |
| JP | A-2007-227321 | 9/2007 |

* cited by examiner

BATTERY CHARGING CONTROL SYSTEM

TECHNICAL FIELD

The present invention relates to a technology of selectively charging a plurality of batteries having different voltages with energy generated by an alternator.

BACKGROUND ART

Patent Document 1 discloses a technology in which in a vehicle equipped with a plurality of batteries having different voltages, the battery for which the maximum generation power of an alternator determined by its rotation speed and voltage is relatively highest is selected to be charged.

Patent Document 2 discloses a technology in which in a vehicle equipped with a plurality of batteries having different voltages, a battery to be charged is selected based on the state of charge (SOC) of the batteries.

PRIOR ART DOCUMENTS

Patent Documents

Patent Document 1: Japanese Patent Application Laid-Open No. 2000-350379
Patent Document 2: Japanese Patent Application Laid-Open No. 2007-227321

DISCLOSURE OF THE INVENTION

Problem to be Solved by the Invention

The power (charging power) acceptable to a battery changes with the state of charge (SOC) of the battery. Therefore, even when a battery having a voltage at which the maximum generation power of the alternator is relatively high is selected, as is the case in the technology disclosed in Patent Document 1, there is a possibility that the power actually charged in the selected battery might be lower than the power that will be attained if another battery is charged.

The present invention has been made in view of the above-described situation, and an object thereof is to provide a technology that enables to make the charging power as high as possible in a battery charging control system for selectively charging a plurality of batteries with power generated by an alternator.

Means for Solving the Problem

According to the present invention, to solve the above-described problem, in a battery charging control system including an alternator having a variable generation voltage and a plurality of batteries that differ in the acceptable charging voltage (e.g. the highest voltage at which they can be charged), the maximum generation power defined as the highest power that the alternator can generate and the maximum charging power defined as the highest power that the battery can accept are obtained, and a battery for which the charging power is highest is selected to be charged based on the comparison of the maximum generation power and the maximum charging power.

Specifically, the battery charging control system according to the present invention comprises:

an alternator that operates utilizing kinetic energy of a motor or a wheel of a vehicle and has a variable generation voltage;

a plurality of batteries having different charging voltages;

first calculation unit for calculating maximum generation power defined as the highest generation power that said alternator can generate at a charging voltage suitable for each battery, using the rotation speed of said alternator as a parameter;

second calculation unit for calculating maximum charging power defined as the highest charging power that each battery can accept, using the state of charge of each battery as a parameter;

obtaining unit for obtaining chargeable power defined as power that can be supplied to each battery from said alternator by comparing said maximum generation power and said maximum charging power;

selection unit for selecting a battery for which the chargeable power obtained by said obtaining unit is highest among said plurality of batteries; and control unit for controlling said alternator in such a way that the battery selected by said selection unit is charged.

The highest power that the alternator can generate (maximum generation power) changes with the rotation speed of the alternator. Therefore, the maximum generation power can be obtained using the rotation speed of the alternator as a parameter. In connection with this, the relationship between the rotation speed of the alternator and the maximum generation power can be obtained in advance based on an experiment. Since the maximum generation power changes with the generation voltage, the maximum generation power shall be obtained for every voltage (charging voltage) suitable for charging of each battery.

The battery for which the maximum generation power is relatively highest among the plurality of batteries may be selected to be charged. (This battery will be hereinafter referred to as the "first battery".) However, the highest charging power acceptable to a battery (the maximum charging power) changes with the state of charge (SOC) of the battery. For example, the maximum charging power tends to be lower when the state of charge is high than when the state of charge is low.

Consequently, there might be cases where the maximum charging power of the first battery is lower than the maximum charging power of another battery. If the first battery is charged in such cases, the charging power of the entire system will be lower than that in the case where another battery is charged. In other words, if the first battery is charged, the amount of kinetic energy transduced into electrical energy by the alternator will be smaller than that in the case where another battery is charged.

In the battery charging control system according to the present invention, the power (chargeable power) that can be supplied to each battery from the alternator is obtained by comparing the maximum generation power of the alternator and the maximum charging power of the battery, and the battery for which the chargeable power is highest is charged.

According to the invention as above, the charging power can be made as much as possible in a battery charging control system including a plurality of batteries having different charging voltages.

The method of obtaining the chargeable power of each battery may be, for example, obtaining the maximum generation power or the maximum chargeable power, whichever is lower, as the chargeable power.

The battery charging control system according to the present invention may further be provided with sensing unit for sensing the temperature of each battery and correction unit for correcting the maximum charging power calculated by the second calculation unit in relation to the temperature sensed by the sensing unit. In this case, the obtaining unit may obtain the chargeable power of each battery by comparing the maximum generation power calculated by the first calculation unit and the maximum chargeable power corrected by the correction unit.

Since the maximum charging power of a battery changes with the temperature of the battery, more accurate maximum charging power can be obtained by correcting the maximum charging power in relation to the temperature of the battery. Thus, more accurate chargeable power of each battery can also be obtained.

It is preferred that the state of charge of the batteries falls within a predetermined range. This is because charging/discharging a battery having a state of charge falling out of the predetermined range might lead to a decrease in the life of the battery.

In view of the above, in the battery charging control system according to the present invention, if there is among the plurality of batteries an insufficiently charged battery having a state of charge lower than a predetermined lower limit, the insufficiently charged battery may be charged more preferentially than the battery selected by the selection unit. It is preferred that the lower limit mentioned here be set to be a little higher than the lowest value in the aforementioned predetermined range. With this battery charging control system, a situation in which the state of charge of the battery becomes lower than the lowest value of the predetermined range can be prevented from occurring, and a decrease in the life of the battery can be prevented thereby.

In the battery charging control system according to the present invention, if the state of charge of the battery selected by the selection unit is higher than a predetermined upper limit, charging of the battery selected by the selection unit may be disabled. It is preferred that the upper limit mentioned here be set to be a little lower than the highest value in the aforementioned predetermined range. With this battery charging control system, a situation in which the state of charge of the battery becomes higher than the highest value of the predetermined range can be prevented from occurring, and a decrease in the life of the battery can be prevented thereby.

In the battery charging control system according to the present invention, when charging of the battery selected by the selection unit is disabled, the alternator may be controlled in such a way that a battery that has the second highest chargeable power is charged. In this case, the charging power can be made as high as possible while preventing a decrease in the life of the batteries.

The present invention can be applied to battery charging control systems in which the batteries used are lead batteries, nickel hydrogen batteries, or lithium-ion batteries.

Effects of the Invention

With the battery charging control system according to the present invention, the charging power can be made as high as possible in a battery charging control system that selectively charges a plurality of batteries with electrical power generated by an alternator.

THE BEST MODE FOR CARRYING OUT THE INVENTION

In the following, specific embodiments of the present invention will be described with reference to the drawings. The dimensions, materials, shapes and relative arrangements etc. of the components that will be described in connection with the embodiments are not intended to limit the technical scope of the present invention only to them, unless particularly stated.

First Embodiment

Figure 1:
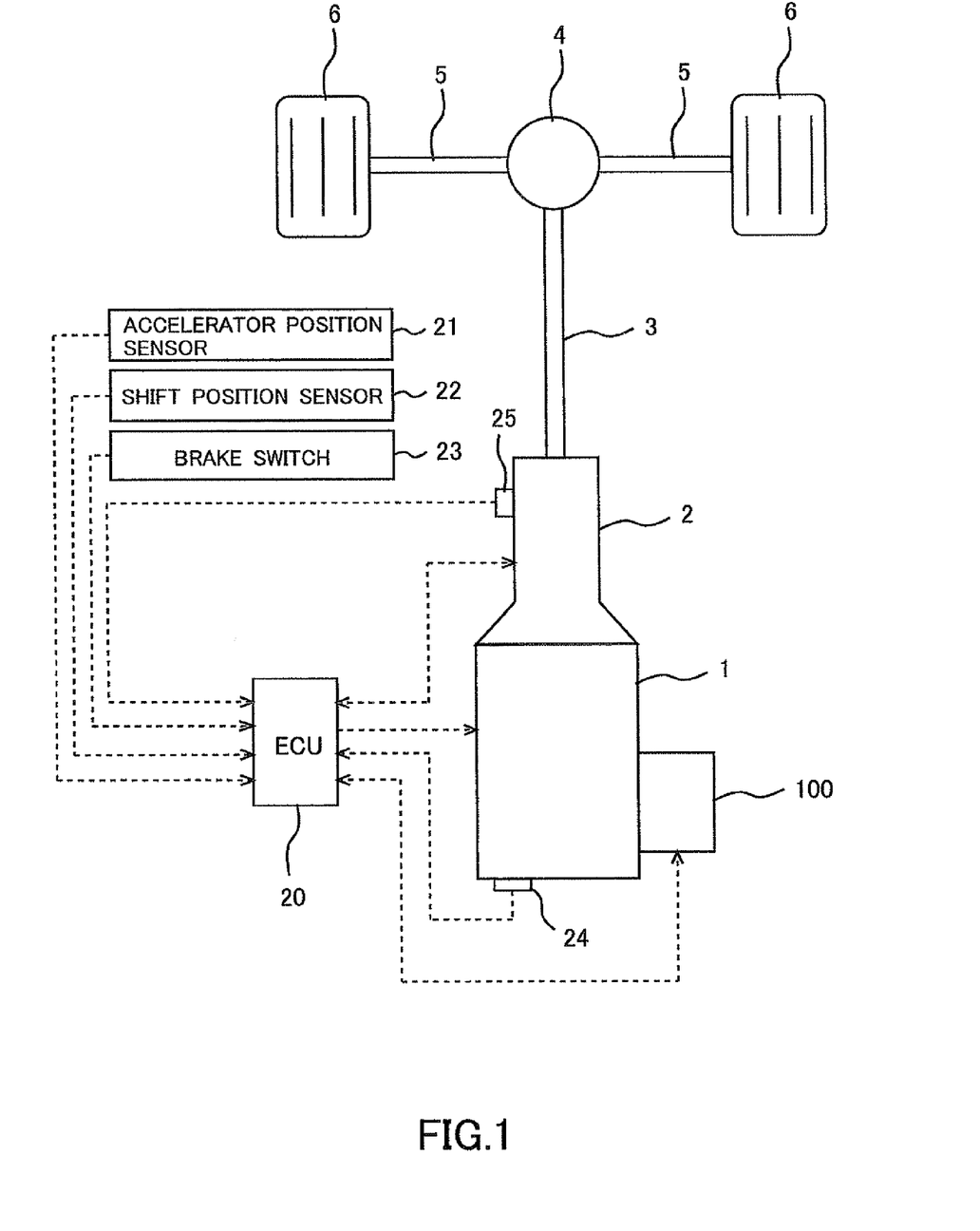
FIG. 1 is a diagram showing the basic configuration of a battery charging control system to which the present invention is applied.

Firstly, a first embodiment of the present invention will be described with reference to FIGS. 1 to 6. FIG. 1 is a diagram showing the basic configuration of a vehicle to which the present invention is applied.

In FIG. 1, the vehicle is equipped with an internal combustion engine 1 as a motor. The output shaft of the internal combustion engine 1 is coupled with the input shaft of a transmission 2. The output shaft of the transmission 2 is coupled to a differential gear 4 via a propeller shaft 3. To the differential gear 4 are connected two drive shafts 5, which are connected to left and right drive wheels 6 respectively.

As the aforementioned transmission 2, for example, a torque converter or a clutch mechanism and a transmission mechanism that changes the change gear ratio stepwise or steplessly may be used in combination.

The power output from the internal combustion engine 1 (i.e. the rotational torque of the output shaft) is subjected to gear change by the transmission 2, then transmitted to the propeller shaft 3, then reduced in speed by the differential gear 4, and then transmitted to the drive shaft 5 and the drive wheels 6.

Figure 2:
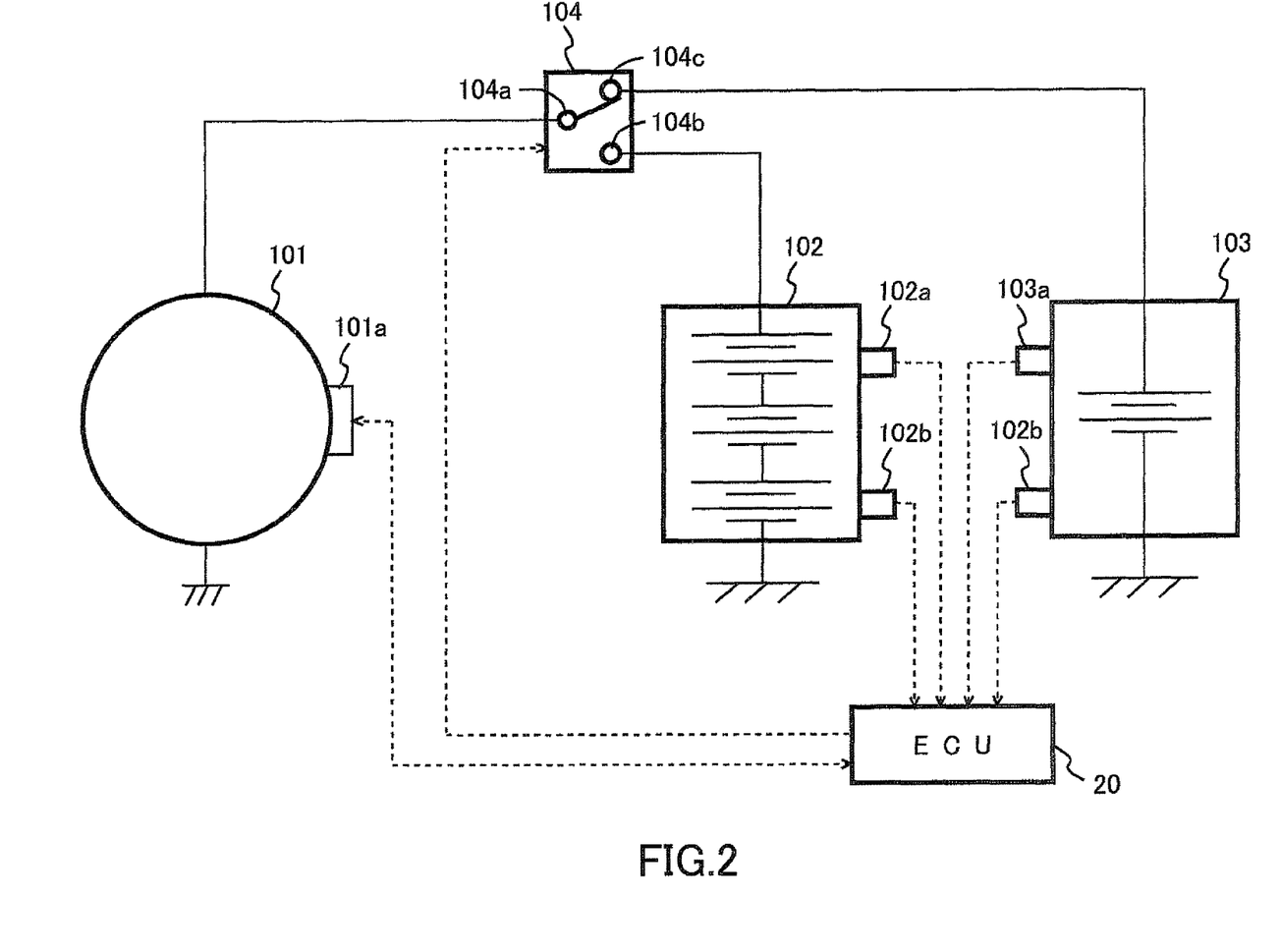
FIG. 2 is a diagram showing the constitution of a charging device.

A charging device 100 is annexed to the internal combustion engine 1. The charging device 100 has an alternator 101, a high voltage battery 102, a low voltage battery 103 and a selector switch 104 as shown in FIG. 2.

The alternator 101 is a generator that is linked with the output shaft (or a member that rotates in conjunction with the output shaft) of the internal combustion engine 1 by a pulley or belt to transduce the kinetic energy (i.e. energy of rotation) of the output shaft into electric energy.

Specifically, the alternator 101 is a three-phase alternate current generator having a stator coil including three-phase coils, a field coil wound around a rotor, a rectifier that rectifies alternate current generated in the stator coil into direct, current, and a regulator 101a for selectively turning on/off a field current supplied to the field coil.

When a field current is supplied to the field coil, the alternator 101 having the above-described configuration generates an induced current (three-phase alternate current) in the stator coil and rectifies the three-phase alternate current thus generated into direct current to output it.

The output of the alternator 101 is adapted to be supplied to an input terminal 104a of the selector switch 104. The selector switch 104 is a circuit having one input terminal 104a and two output terminals 104b, 104c to selectively connect the input terminal 104a to one of the two output terminals 104b, 104c.

One terminal 104b (which will be hereinafter referred to as the "first output terminal") among the two output terminals 104b, 104c of the selector switch 104 is connected to the high voltage battery 102. The other terminal 104c (which will be hereinafter referred to as the "second output terminal") among the two output terminals 104b, 104c is connected to the low voltage battery 103.

The high voltage battery 102 is a battery that can be charged and discharged at a high voltage (e.g. 42 volts or so). The high voltage battery 102 is a lead battery, nickel hydrogen battery, or a lithium-ion battery. The low voltage battery 103 is a battery that can be charged and discharged at a voltage (e.g. 14 volts or so) lower than that of the high voltage battery 102. The low voltage battery 103 is a lead battery, nickel hydrogen battery, or a lithium-ion battery.

Returning to FIG. 1, the vehicle is provided with an electronic control unit (ECU) 20 that electrically controls the internal combustion engine 1, the transmission 2 and the charging device 100. Although FIG. 1 illustrates one ECU 20, there may be separately provided an ECU for the internal combustion engine 1, an ECU for the transmission 2, and an ECU for the charging device 100.

Signals output from various sensors such as an accelerator position sensor 21, a shift position sensor 22, a brake switch 23, a crank position sensor 24, a speed sensor 25, a first SOC sensor 102a, a first temperature sensor 102b, a second SOC sensor 103a and a second temperature sensor 103b are adapted to input to the ECU 20.

The accelerator position sensor 21 is a sensor that outputs an electrical signal correlating with the amount of operation (or the amount of depression) of the accelerator pedal. The shift position sensor 22 is a sensor that outputs an electrical signal correlating with the operation position of the shift lever. The brake switch 23 is a sensor that outputs an "ON" signal when the brake pedal is depressed. The crank position sensor 24 is a sensor that outputs an electrical signal correlating with the rotational position of the output shaft (crankshaft) of the internal combustion engine 1. The speed sensor 25 is a sensor that outputs an electrical signal correlating with the traveling speed of the vehicle. The first SOC sensor 102a is a sensor that outputs an electrical signal correlating with the state of charge of the high voltage battery 102. The first temperature sensor 102b is a sensor that outputs an electrical signal correlating with the temperature of the high voltage battery 102. The second SOC sensor 103a is a sensor that outputs an electrical signal correlating with the state of charge of the low voltage battery 103. The second temperature sensor 103b is a sensor that outputs an electrical signal correlating with the temperature of the low voltage battery 103.

The ECU 20 controls the operation state of the internal combustion engine 1, the gear change state of the transmission 2 and the generating state of the charging device 100 etc. based on the signals output from the above-described various sensors. In the following, a method of controlling the charging device 100 will be described.

The ECU 20 performs a duty control to turn on/off the regulator 101a, thereby changing the voltage generated by the alternator 101. For example, when making the voltage generated by the alternator 101 higher, the ECU 20 sets the duty cycle in such a way as to make the on-time of the regulator 101a longer (or to make the off-time shorter). On the other hand, when making the voltage generated by the alternator 101 lower, the ECU 20 sets the duty cycle in such a way as to make the on-time of the regulator 101a shorter (or to make the off-time longer). In addition, the ECU 20 senses the actual voltage generated by the alternator 101 and feedback-controls the duty cycle based on the difference between the actually generated voltage and a target generation voltage.

Moreover, when charging the high voltage battery 102, the ECU 20 controls the duty cycle of the regulator 101a in such a way as to make the voltage generated by the alternator 101 equal to a voltage suitable for charging the high voltage battery 102 (high voltage) and controls the selector switch 104 to connect the input terminal 104a and the first output terminal 104b.

On the other hand, when charging the low voltage battery 103, the ECU 20 controls the duty cycle of the regulator 101a in such a way as to make the voltage generated by the alternator 101 equal to a voltage suitable for charging the low voltage battery 103 (low voltage) and controls the selector switch 104 to connect the input terminal 104a and the second output terminal 104c.

When the vehicle is decelerating, the rotor of the alternator 101 is rotated by kinetic energy transmitted from the drive wheels 6 to the internal combustion engine 1. If a field current is supplied to the alternator 101 in this state, the kinetic energy of the drive wheels 6 can be transduced into electric energy (regeneration).

Thus, when the vehicle is decelerating with fuel cut, the ECU 20 supplies a field current to the alternator 101 and performs a regeneration control to charge the high voltage battery 102 or the low voltage battery 103 with the electric energy regenerated by the alternator 101.

In this process, it is desirable that as much kinetic energy as possible be recovered by regeneration. In connection with this, the maximum generation power Wh that the alternator 101 can generate at a voltage Vh suitable for charging the high voltage battery 102 (which voltage will be hereinafter referred to as the "high charging voltage") or the maximum generation power Wl that the alternator 101 can generate at a voltage Vl suitable for charging the low voltage battery 103 (which voltage will be hereinafter referred to as the "low charging voltage"), whichever is higher, may be selected in performing the regeneration.

Figure 3:
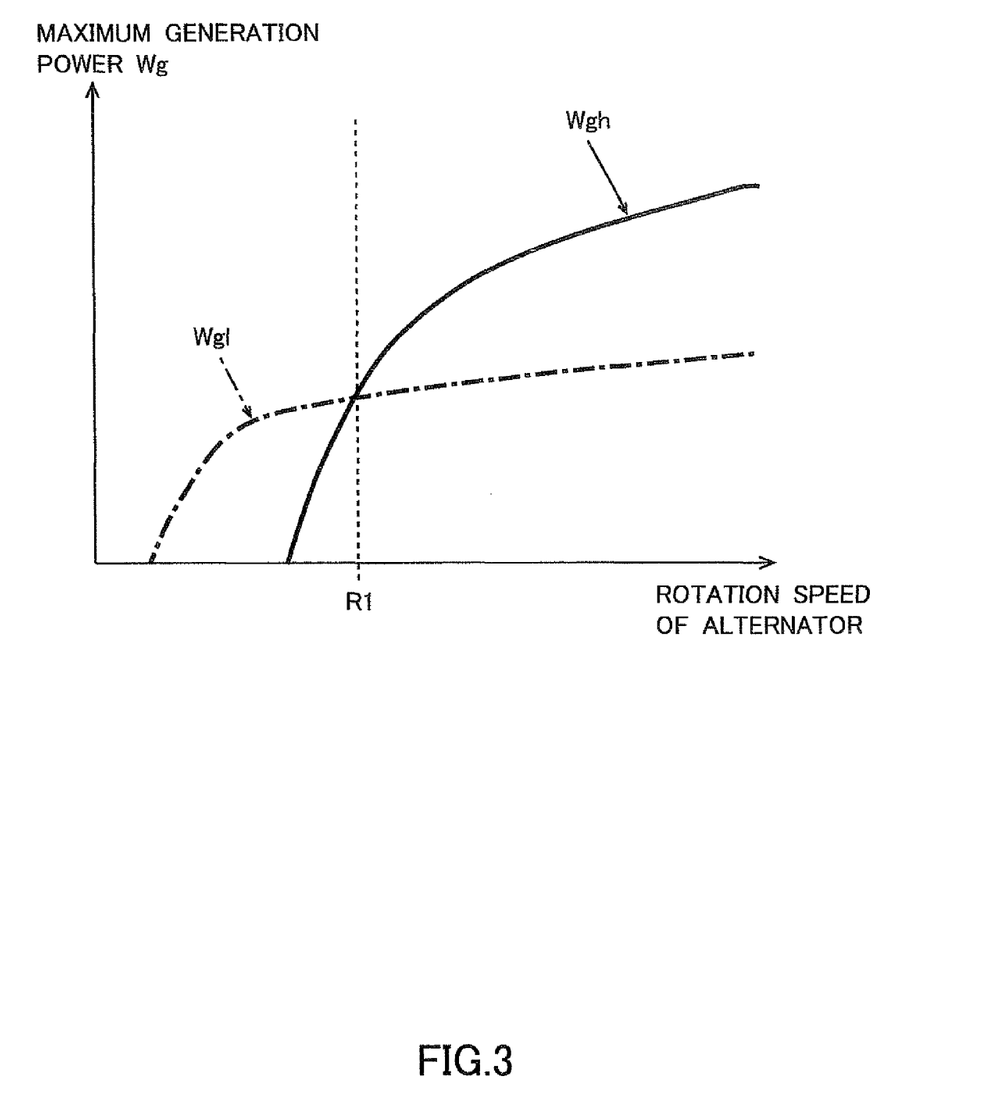
FIG. 3 shows the relationship between the rotation speed of the alternator and the maximum generation power.

The maximum generation power Wh, Wl of the alternator changes with the rotation speed of the alternator 101 (or the rotation speed of the rotor). FIG. 3 shows the relationship between the maximum generation power of the alternator 101 and the rotation speed. The solid curve in FIG. 3 represents the maximum generation power Wh in the case where the alternator 101 generates electricity at the high charging voltage Vh, and the alternate long and short dashed curve represents the maximum generation power Wl in the case where the alternator generates electricity at the low charging voltage Vl.

In FIG. 3, when the rotation speed of the alternator 101 is lower than a certain rotation speed R1, the maximum generation power Wgl generated at the low charging voltage Vl is higher than the maximum generation power Wgh generated at the high charging voltage Vh. On the other hand, when the rotation speed of the alternator 101 is higher than the certain rotation speed R1, the maximum generation power Wgh generated at the high charging voltage Vh is higher than the maximum generation power Wgl generated at the low charging voltage Vl.

Therefore, when the rotation speed of the alternator 101 is lower than the certain rotation speed R1, the regeneration may be performed at the low charging voltage Vl, and when the rotation speed of the alternator 101 is higher than the certain rotation speed R1, the regeneration may be performed at the high charging voltage Vh. In other words, when the rotation speed of the alternator 101 is lower than the certain rotation speed R1, the low voltage battery 103 may be charged, and when the rotation speed of the alternator 101 is higher than the certain rotation speed R1, the high voltage battery 102 may be charged.

Figure 4:
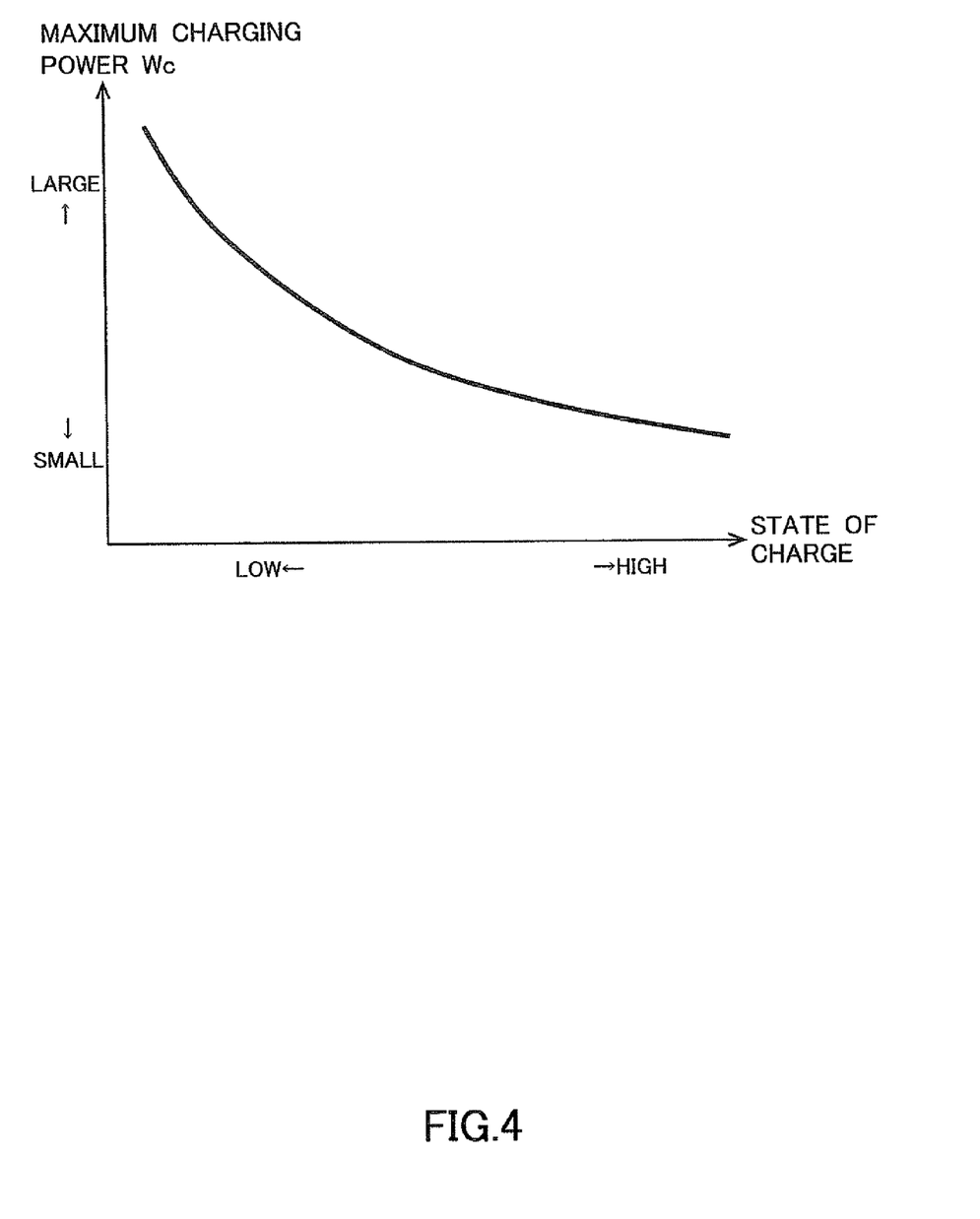
FIG. 4 shows the relationship between the state of charge of a battery and the maximum charging power.

The maximum charging power Wc acceptable to the high voltage battery 102 and the low voltage battery 103 changes with the state of charge of each battery. FIG. 4 shows the relationship between the state of charge of a battery and the maximum charging power Wc. As shown in FIG. 4, the maximum charging power Wc of the battery tends to be higher when the state of charge is low than when the state of charge is high.

Figure 5:
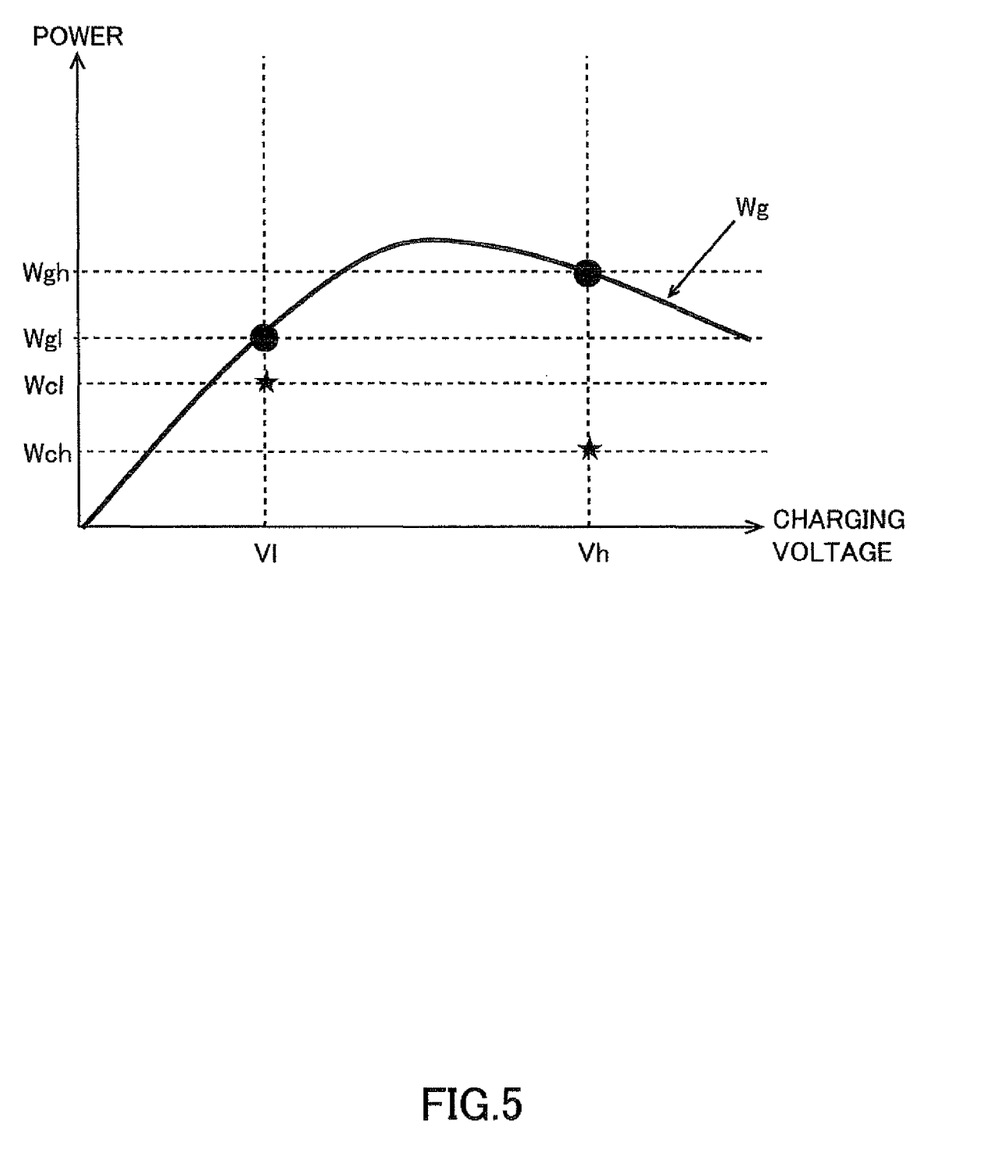
FIG. 5 shows an instance in which the maximum charging power of the low voltage battery exceeds the maximum charging power of the high voltage battery.

Consequently, when the state of charge of the high voltage battery 102 is high and the state of charge of the low voltage battery 103 is low, the maximum charging power Wcl of the low voltage battery 103 might be higher than the maximum charging power Wch of the high voltage battery 102 as shown in FIG. 5. In such cases, if the battery to be charged is selected based on a comparison of the magnitudes of the maximum generation powers Wgh and Wgl, the kinetic energy recovered by regeneration will become smaller.

In view of the above, in the regeneration control in this embodiment, the ECU 20 determines the powers (chargeable powers) Wph, Wpl that the alternator 101 can supply (for charging) to the respective batteries 102, 103 and selects the battery to be charged 102, 103 based on a comparison of the magnitudes of the chargeable powers Wph, Wpl. Specifically, the ECU 20 selects the battery for which the chargeable power Wph, Wpl is higher among the high voltage battery 102 and the low voltage battery 103. The selection of the battery to be charged in this way will make the kinetic energy recovered by the regeneration as much as possible.

Figure 6:
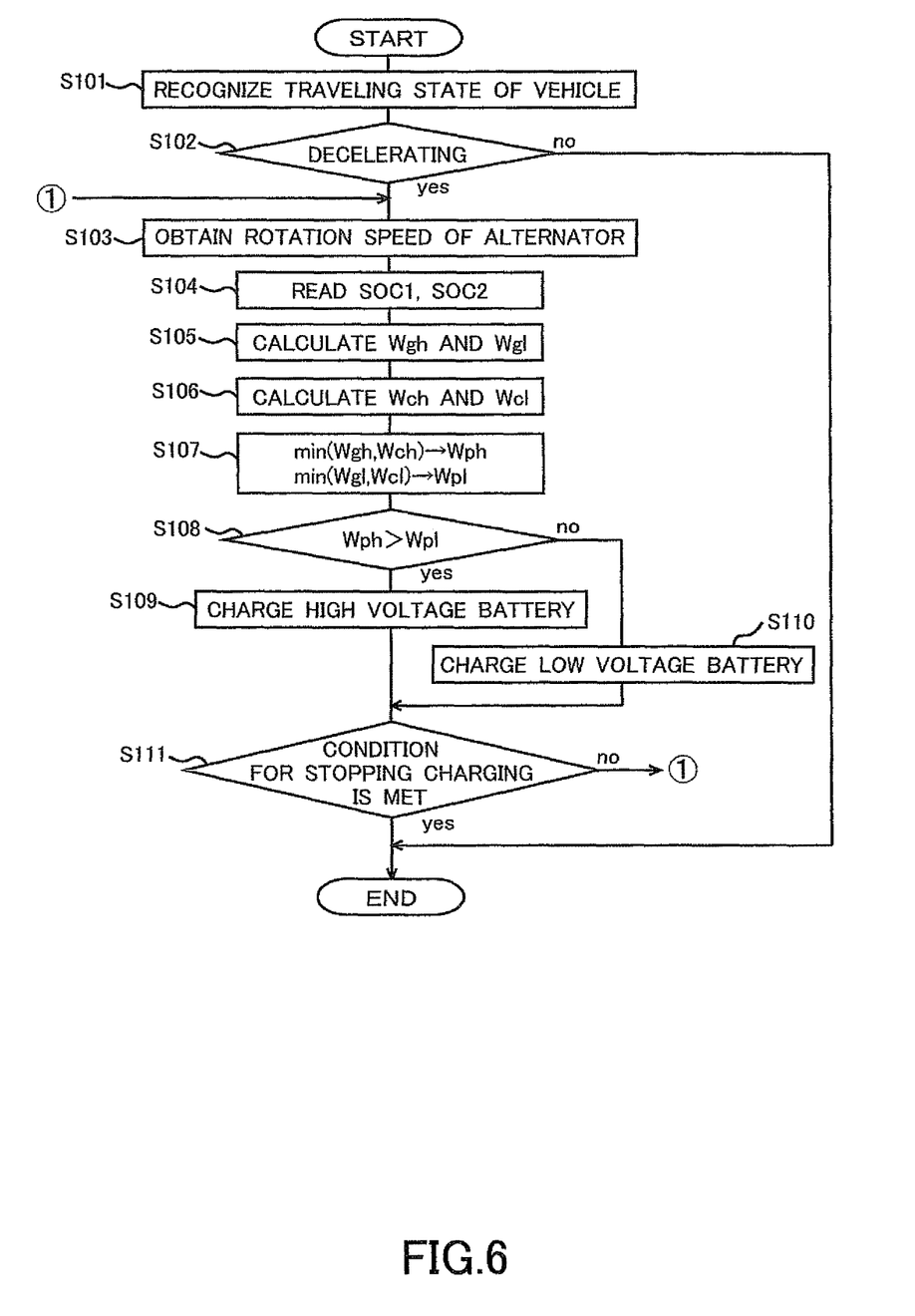
FIG. 6 is a flow chart of a regeneration control routine in a first embodiment.

In the following, a procedure of execution of a regeneration control in this embodiment will be described with reference to FIG. 6. FIG. 6 is a flow chart of a regeneration control routine. The regeneration control routine is stored in a ROM of the ECU 20 in advance and executed periodically by the ECU 20.

In the regeneration control routine in FIG. 6, firstly in step S101, the ECU 20 recognizes the traveling state of the vehicle based on signals output from the accelerator position sensor 21 and the speed sensor 25.

In step S102, the ECU 20 determines whether or not the vehicle is in a decelerating traveling state. If the determination in step S102 is negative, the ECU 20 once terminates the execution of this routine. On the other hand, if the determination in step S102 is affirmative, the ECU 20 proceeds to step S103.

In step S103, the ECU 20 obtains the rotation speed of the alternator 101. The rotation speed of the alternator 101 can be calculated using as parameters the rotation speed of the internal combustion engine 1 (i.e. the rotation speed of the crankshaft) and the gear ratio of a mechanism that transmits power from the crankshaft to the alternator 101.

In step S104, the ECU 20 reads a signal SOC1 output from the first SOC sensor 102a and a signal SOC2 output from the second SOC sensor 103a.

In step S105, the ECU 20 calculates the maximum generation powers Wgh and Wgl using as parameters the rotation speed of the alternator 101 obtained in the above step S103 and the charging voltages Vh and Vl of the respective batteries 102 and 103. In connection with this, a map (e.g. one shown in FIG. 3) specifying the relationship between the rotation speed of the alternator 101 and the maximum generation power Wg may be stored in advance in the ROM of the ECU 20. The execution of the process of step S103 by the ECU 20 embodies the first calculation unit according to the present invention.

In step S106, the ECU 20 calculates the maximum charging power Wch of the high voltage battery 102 and the maximum charging power Wcl of the low voltage battery 103, using as parameters the signals SOC1, SOC2 read in the above step S104. In connection with this, a map (e.g. one shown in FIG. 4) specifying the relationship between the maximum charging power Wc and the state of charge (SOC) may be prepared for each of the batteries 102, 103, and such maps may be stored in advance in the ROM of the ECU 20. The execution of the process of step S106 by the ECU 20 embodies the second calculation unit according to the present invention.

The maximum charging powers Wch, Wcl of the batteries 102, 103 change with the temperatures of the batteries 102, 103. Therefore, the ECU 20 may be adapted to correct the maximum charging powers Wch, Wcl based on signals output from the first temperature sensor 102b and the second temperature sensor 103b. In connection with this, the relationship between the temperature of the battery 102, 103 and the correction amount may be obtained in advance by an adaptation process based on an experiment etc.

The ECU 20 may be adapted to calculate the maximum charging powers Wch, Wcl based on the relationship between the internal resistance and the stage of charge of the batteries 102, 103. Since the internal resistances of the battery 102, 103 change with the temperature, the internal resistances of the battery 102, 103 may be corrected using as parameters signals output from the first temperature sensor 102b and the second temperature sensor 103b.

Returning to FIG. 6, in step S107 the ECU 20 determines the chargeable powers Wph, Wpl of the respective batteries 102, 103 by comparing the maximum generation powers Wgh, Wgl obtained in the above step S105 and the maximum charging powers Wch, Wcl obtained in the above step S106. Specifically, the ECU 20 determines the chargeable power Wph of the high voltage battery 102 as the maximum generation power Wgh or the maximum charging power Wch, whichever is lower. Furthermore, the ECU 20 determines the chargeable power Wpl of the low voltage battery 103 as the maximum generation power Wgl or the maximum charging power Wcl, whichever is lower. The execution of the process of step S107 by the ECU 20 embodies the obtaining means unit according to the present invention.

In FIG. S108, the ECU 20 compares the chargeable power Wph and the chargeable power Wpl obtained in the above step S107. Specifically, the ECU 20 determines whether or not the chargeable power Wph of the high voltage battery 102 is higher than the chargeable power Wpl of the low voltage battery 103.

If the determination in step S108 is affirmative (Wph>Wpl), the ECU 20 proceeds to step S109, where it executes the process for charging the high voltage battery 102. Specifically, the ECU 20 controls the duty cycle of the regulator 101a to make the generation voltage of the alternator 101 equal to the high charging voltage Vh and controls the selection switch 104 to connect the input terminal 104a and the first output terminal 104b.

On the other hand, if the determination in step S108 is negative (Wph≤Wpl), the ECU 20 proceeds to step S110, where it executes the process for charging the low voltage battery 103. Specifically, the ECU 20 controls the duty cycle of regulator 101a to make the generation voltage of the alternator 101 equal to the low charging voltage Vl and controls the selection switch 104 to connect the input terminal 104a and the second output terminal 104c. When the chargeable power Wph of the high voltage battery 102 and the chargeable power Wpl of the low voltage battery 103 are equal to each other, the high voltage battery 102 may be charged.

The execution of the process of step S108 by the ECU 20 embodies the selection unit according to the present invention, and the execution of the process of step S109 or S110 by the ECU 20 embodies the control unit according to the present invention.

After executing the process of the above step S109 or S110, the ECU 20 proceeds to step S111. In step S111, the ECU 20 determines whether or not the condition for stopping the regeneration is met. The condition for stopping the regeneration is met when the traveling state of the vehicle changes from a decelerating traveling state to a non-decelerating traveling state.

If the determination in the above step S111 is affirmative, the ECU 20 proceeds to step S112, where it stops the regeneration by the alternator 101. On the other hand, if the determination in the above step S111 is negative, the ECU 20 returns to the above-mentioned step S103.

With the execution of the regeneration control according to the routine shown in FIG. 6 by the ECU 20, the kinetic energy recovered by regeneration can be made as much as possible. Consequently, the power with which the high voltage battery 102 or the low voltage battery 103 is charged can be made as high as possible.

Second Embodiment

Next, a second embodiment of the present invention will be described with reference to FIG. 7. Here, features different from those in the first embodiment will be described, and like features will not be described.

The difference between this embodiment and the above-described first embodiment resides in that the regeneration control is performed in such a way that the state of charge of each battery 102, 103 is kept within an allowable range. The life of the batteries 102, 103, which are lead batteries, nickel hydrogen batteries or lithium-ion batteries, might be decreased if they are used (i.e. charged or discharged) in an excessively high or low state of charge.

In view of this, in the regeneration control in this embodiment, when the state of charge of either the high voltage battery 102 or the low voltage battery 103 is lower than a predetermined lower limit (i.e. in an insufficient charge state), the ECU 20 preferentially charges the battery 102, 103 in an insufficient charge state. In addition, when the state of charge of either the high voltage battery 102 or the low voltage battery 103 is higher than a predetermined upper limit (i.e. in an overcharge state), the ECU 20 disables charging of the battery 102, 103 in an overcharge state.

The aforementioned lower limit is a little higher than the lowest value in the allowable range, and the aforementioned upper limit is a little lower than the highest value in the allowable range.

With the charging condition in regeneration set as above, the charging power can be made as high as possible while preventing a decrease in the life of the batteries 102, 103.

In the following, a procedure of executing the regeneration control in this embodiment will be described with reference to FIG. 7. FIG. 7 is a flow chart of a regeneration control routine. In FIG. 7, the processes same as those in the first embodiment (see FIG. 6) are denoted by the same symbols.

Figure 7:
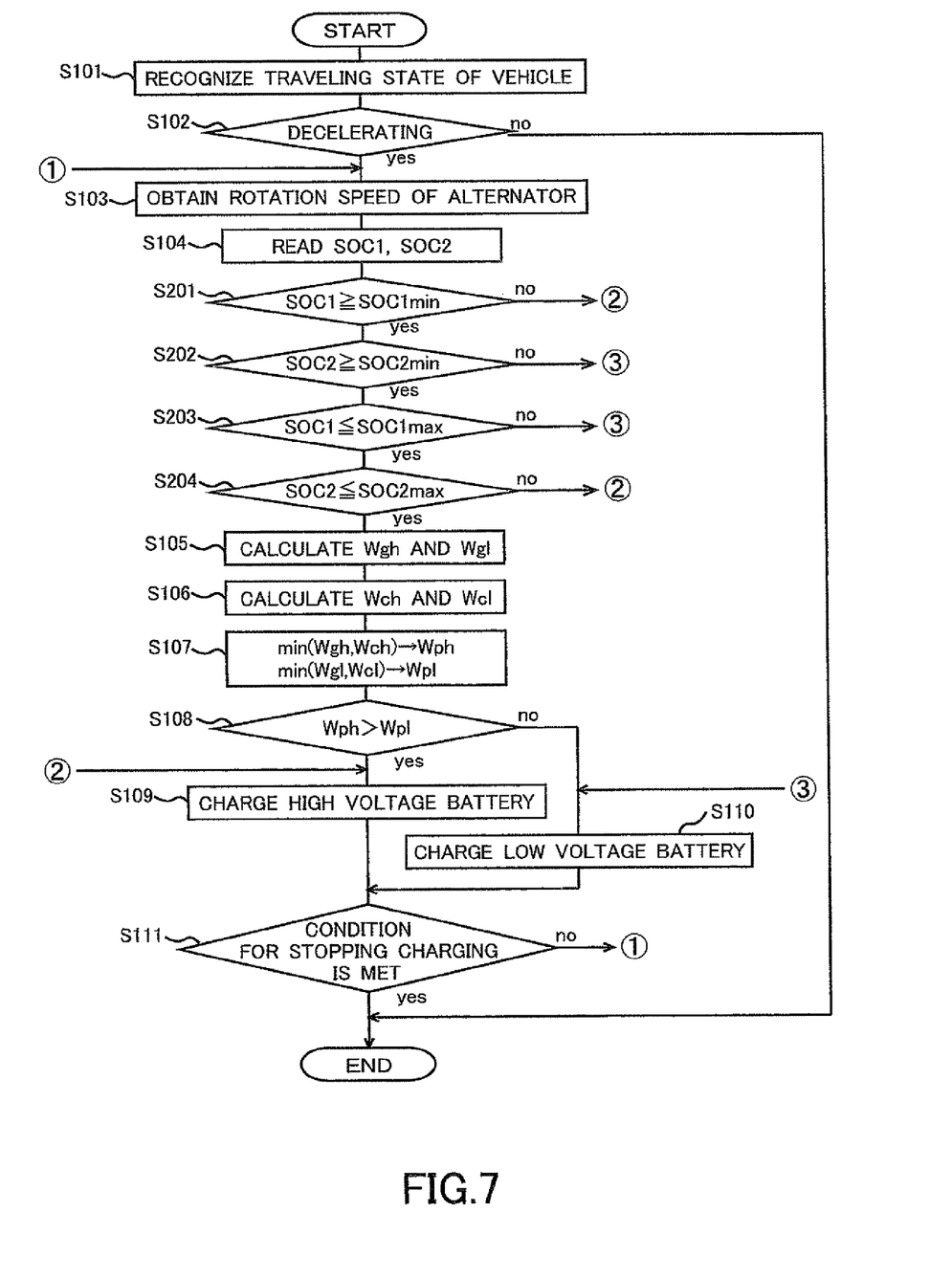
FIG. 7 is a flow chart of a regeneration control routine in a second embodiment.

In the regeneration control routine in FIG. 7, the ECU 20 executes the process of step S201 after executing the process of step S104. In step S201, the ECU 20 determines whether or not the output signal SOC1 of the first SOC sensor 102a read in the aforementioned step S104 is equal to or higher than a lower limit SOC1min. The lower limit SOC1min has a value a little higher than the lowest value of the state of charge at which it is considered that a decrease in the life of the high voltage battery 102 might be caused. The lower limit SOC1min is determined in advance by an adaptation process based on an experiment etc.

If the determination in the above step S201 is negative (SOC1<SOC1min), the ECU 20 proceeds to step S109, where it executes charging of the high voltage battery 102 preferentially. On the other hand, if the determination in the above step S201 is affirmative (SOC1≥SOC1min), the ECU 20 proceeds to step S202.

In step S202, the ECU 20 determines whether or not the output signal SOC2 of the second SOC sensor 103a read in the aforementioned step S104 is equal to or higher than a lower limit SOC2min. The lower limit SOC2min has a value a little higher than the lowest value of the state of charge at which it is considered that a decrease in the life of the low voltage battery 103 might be caused. The lower limit SOC2min is determined in advance by an adaptation process based on an experiment etc.

If the determination in the above step S202 is negative (SOC2<SOC2min), the ECU 20 proceeds to step S110, where it executes charging of the low voltage battery 103 preferentially. On the other hand, if the determination in the above step S202 is affirmative (SOC2≥SOC2min), the ECU 20 proceeds to step S203.

In step S203, the ECU 20 determines whether or not the output signal SOC1 of the first SOC sensor 102a read in the aforementioned step S104 is equal to or lower than an upper limit SOC1max. The upper limit SOC1max has a value a little lower than the highest value of the state of charge at which it is considered that a decrease in the life of the high voltage battery 102 might be caused. The upper limit SOC1max is determined in advance by an adaptation process based on an experiment etc.

If the determination in the above step S203 is negative (SOC1>SOC1max), the ECU 20 proceeds to step S110, where it executes charging of the low voltage battery 103 preferentially. On the other hand, if the determination in the above step S203 is affirmative (SOC1≤SOC1max), the ECU 20 proceeds to step S204.

In step S204, the ECU 20 determines whether or not the output signal SOC2 of the second SOC sensor 103a read in the aforementioned step S104 is equal to or lower than an upper limit SOC2max. The upper limit SOC2max has a value a little lower than the highest value of the state of charge at which it is considered that a decrease in the life of the low voltage battery 103 might be caused. The upper limit SOC2max is determined in advance by an adaptation process based on an experiment etc.

If the determination in the above step S204 is negative (SOC2>SOC2max), the ECU 20 proceeds to step S109, where it executes charging of the high voltage battery 102 preferentially. On the other hand, if the determination in the above step S204 is affirmative (SOC2≤SOC2max), the ECU 20 proceeds to step S105.

With the execution of the regeneration control routine shown in FIG. 7 by the ECU 20, the charging power can be made as high as possible while preventing a decrease in the life of the batteries 102, 103.

DESCRIPTION OF THE REFERENCE NUMERALS AND SYMBOLS

Description of the Reference Signs

1: internal combustion engine
2: transmission
3: propeller shaft
4: differential gear
5: drive shaft
6: drive wheel
21: accelerator position sensor
22: shift position sensor
23: brake switch
24: crank position sensor
25: speed sensor
100: charging device
101: alternator
101a: regulator
102: high voltage battery
102a: first SOC sensor
102b: first temperature sensor
103: low voltage battery
103a: second SOC sensor
103b: second temperature sensor
104: selection switch
104a: input terminal
104b: first output terminal
104c: second output terminal

The invention claimed is:

1. A battery charging control system comprising:
an alternator that operates utilizing kinetic energy of a motor or a wheel of a vehicle and has a variable generation voltage;
a plurality of batteries having different charging voltages;
first calculation unit for calculating maximum generation power defined as the highest generation power that said alternator can generate at a charging voltage suitable for each battery, using the rotation speed of said alternator as a parameter;
second calculation unit for calculating maximum charging power defined as the highest charging power that each battery can accept, using the state of charge of each battery as a parameter;
obtaining unit for obtaining chargeable power defined as power that can be supplied to each battery from said alternator by comparing said maximum generation power and said maximum charging power;
selection unit for selecting a battery for which the chargeable power obtained by said obtaining unit is highest among said plurality of batteries; and
control unit for controlling said alternator in such a way that the battery selected by said selection unit is charged.

2. A battery charging control system according to claim 1, wherein said obtaining unit obtains as the chargeable power said maximum generation power or said maximum chargeable power, whichever is lower.

3. A battery charging control system according to claim 2, further comprising:
sensing unit for sensing the temperature of each battery; and
correction unit for correcting the maximum charging power calculated by said second calculation unit in relation to the temperature sensed by said sensing unit,
wherein said obtaining unit obtains the chargeable power of each battery by comparing the maximum generation power calculated by said first calculation unit and the maximum charging power corrected by said correction unit.

4. A battery charging control system according to claim 3, wherein if there is among said plurality of batteries an insufficiently charged battery having a state of charge lower than a predetermined lower limit, said control unit controls said alternator in such a way that the insufficiently charged battery is charged more preferentially than the battery selected by said selection unit.

5. A battery charging control system according to claim 3, wherein if the state of charge of the battery selected by said selection unit is higher than a predetermined upper limit, said control unit disables charging of the battery selected by said selection unit.

6. A battery charging control system according to claim 5, wherein said control unit controls said alternator in such a way that a battery that has the second highest chargeable power obtained by said obtaining unit among said plurality of batteries is charged.

7. A battery charging control system according to claim 2, wherein if there is among said plurality of batteries an insufficiently charged battery having a state of charge lower than a predetermined lower limit, said control unit controls said alternator in such a way that the insufficiently charged battery is charged more preferentially than the battery selected by said selection unit.

8. A battery charging control system according to claim 2, wherein if the state of charge of the battery selected by said selection unit is higher than a predetermined upper limit, said control unit disables charging of the battery selected by said selection unit.

9. A battery charging control system according to claim 8, wherein said control unit controls said alternator in such a way that a battery that has the second highest chargeable power obtained by said obtaining unit among said plurality of batteries is charged.

10. A battery charging control system according to claim 1, further comprising:
sensing unit for sensing the temperature of each battery; and
correction unit for correcting the maximum charging power calculated by said second calculation unit in relation to the temperature sensed by said sensing unit,
wherein said obtaining unit obtains the chargeable power of each battery by comparing the maximum generation power calculated by said first calculation unit and the maximum charging power corrected by said correction unit.

11. A battery charging control system according to claim 10, wherein if there is among said plurality of batteries an insufficiently charged battery having a state of charge lower than a predetermined lower limit, said control unit controls said alternator in such a way that the insufficiently charged battery is charged more preferentially than the battery selected by said selection unit.

12. A battery charging control system according to claim 10, wherein if the state of charge of the battery selected by said selection unit is higher than a predetermined upper limit, said control unit disables charging of the battery selected by said selection unit.

13. A battery charging control system according to claim 12, wherein said control unit controls said alternator in such a way that a battery that has the second highest chargeable power obtained by said obtaining unit among said plurality of batteries is charged.

14. A battery charging control system according to claim 1, wherein if there is among said plurality of batteries an insufficiently charged battery having a state of charge lower than a predetermined lower limit, said control unit controls said alternator in such a way that the insufficiently charged battery is charged more preferentially than the battery selected by said selection unit.

15. A battery charging control system according to claim 1, wherein if the state of charge of the battery selected by said selection unit is higher than a predetermined upper limit, said control unit disables charging of the battery selected by said selection unit.

16. A battery charging control system according to claim 15, wherein said control unit controls said alternator in such a way that a battery that has the second highest chargeable power obtained by said obtaining unit among said plurality of batteries is charged.

* * * * *